(12) United States Patent
Chen et al.

(10) Patent No.: US 12,729,979 B2
(45) Date of Patent: Sep. 8, 2026

(54) MAP QUALITY ASSESSMENT SYSTEM

(71) Applicant: GM Global Technology Operations LLC, Detroit, MI (US)

(72) Inventors: Gui Chen, Sterling Heights, MI (US); Fan Bai, Ann Arbor, MI (US); Mason David Gemar, Cedar Park, TX (US); Joon Hwang, Pflugerville, TX (US); Shu Chen, Rochester Hills, MI (US); Ibrahim Onifade, Katy, TX (US); Leila Ghorban Zadeh, Seattle, WA (US); Christian Haller, Austin, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 209 days.

(21) Appl. No.: 18/599,627

(22) Filed: Mar. 8, 2024

(65) Prior Publication Data

US 2025/0283732 A1 Sep. 11, 2025

(51) Int. Cl.
*G01C 21/00* (2006.01)

(52) U.S. Cl.
CPC ....... *G01C 21/387* (2020.08); *G01C 21/3815* (2020.08)

(58) Field of Classification Search
CPC .............. G01C 21/387; G01C 21/3815; G01C 21/3848; G01C 21/3841
See application file for complete search history.

(56) References Cited

U.S. PATENT DOCUMENTS

2010/0241354 A1* 9/2010 Stahlin .................. B60W 40/02 701/532
2013/0024104 A1* 1/2013 Stahlin .................. G01C 21/28 701/409
2017/0314934 A1* 11/2017 Averbuch ................ G01S 19/50
2019/0107836 A1* 4/2019 Walker ................... G01C 21/28
2019/0163176 A1* 5/2019 Wang .................. G05D 1/0027
2020/0250439 A1 8/2020 Vig
2022/0161817 A1 5/2022 Anastassov

FOREIGN PATENT DOCUMENTS

DE 102006032374 A1 5/2007
DE 112018008077 T5 9/2021

OTHER PUBLICATIONS

U.S. Appl. No. 18/171,848 to Chen et al., filed Feb. 21, 2023.

* cited by examiner

*Primary Examiner* — Thomas E Worden
*Assistant Examiner* — Godfrey Aleksander Maciorowski
(74) *Attorney, Agent, or Firm* — Vivacqua Crane, PLLC

(57) ABSTRACT

A map quality assessment system that evaluates error associated with primary map data includes one or more central computers that execute instructions to determine the error associated with the primary map data, compare the error associated with the primary map data with a range of values defined by one or more quality metric values, and in response to determining the error associated with the primary map data falls within the range of values defined by the one or more quality metric values, retain a template for selecting the primary map data. In response to determining the error associated with the primary map data falls outside the range defined by the one or more quality metric values, the one or more central computers evaluate the primary map data for real-life anomalies within one or more roadways represented by the primary map data.

14 Claims, 6 Drawing Sheets

MAP QUALITY ASSESSMENT SYSTEM

INTRODUCTION

The present disclosure relates to a map quality assessment system that evaluates error associated with map data. The map quality assessment system evaluates the error associated with the map data based on gold source map data or, in the alternative, based on a self-evaluation without the gold source map data.

An autonomous vehicle executes various tasks such as, but not limited to, perception, localization, mapping, path planning, decision making, and motion control. Autonomous vehicles rely upon map data for many of the tasks that are executed such as localization, mapping, and path planning. It is to be appreciated that different versions of map data representing the same geographical area may be generated, where each version of the map data is generated from different data sources.

One example of a version of map data is based on telemetry data. The telemetry data may be collected from numerous vehicles and combined based on various aggregation algorithms to determine various types of map content such as, for example, global positioning system (GPS) trajectories, and subsequently inferred lane geometries. However, it is to be appreciated that error such as, for example, lateral bias error, random noise, and the like, may exist when the map content is compared to content generated based on ground truth data. The error may cause the map data to indicate an inaccurate position of the lane lines, which in turn may cause issues with localization and may lead to inaccurate decisions that are made by the autonomous vehicle's control system.

Thus, while maps for autonomous vehicles achieve their intended purpose, there is a need in the art for an improved approach for evaluating map quality.

SUMMARY

According to several aspects, a map quality assessment system that evaluates error associated with primary map data is disclosed. The map quality assessment system includes one or more central computers in wireless communication one or more communication networks for receiving the primary map data. The one or more central computers executes instructions to determine the error associated with the primary map data, wherein the primary map data represents a predefined geofenced area. The one or more central computers compare the error associated with the primary map data with a range of values defined by one or more quality metric values. In response to determining the error associated with the primary map data falls within the range of values defined by the one or more quality metric values, The one or more central computers retain a template for selecting the primary map data representing the predefined geofenced area. In response to determining the error associated with the primary map data falls outside the range defined by the one or more quality metric values, the one or more central computers evaluate the primary map data for real-life anomalies within one or more roadways represented by the primary map data. In response to determining no real-life anomalies exist within the one or more roadways represented by the primary map data, the one or more central computers implement an updated template for selecting primary map data points representing the predefined geofenced area based on the one or more quality metric values.

In another aspect, the one or more central computers execute instructions to implement the updated template implemented by: updating weights assigned to the primary map data points of the primary map data based on a corresponding level of accuracy.

In yet another aspect, the weights corresponding to the primary map data points including a higher level of accuracy based on the one or more quality metric values are assigned a higher weighted value and the weights corresponding to the primary map data points including a lower level of accuracy based on the one or more quality metric values are assigned a lower weighted value.

In an aspect, the one or more central computers execute instructions to: determine the error associated with the primary map data based on an absolute offset between primary map data points corresponding to the primary map data and gold source map data points corresponding to gold source map data.

In another aspect, the one or more central computers execute instructions to: receive road network data representing a road network for the predefined geofenced area, where the road network is a network graph that models roadways based on a plurality of road segments.

In yet another aspect, the one or more central computers determine the absolute offset between the primary map data points and the gold source map data points based on a bounding box approach that creates a plurality of bounding boxes that each enclose one of the plurality of road segments that are part of the road network.

In an aspect, the one or more central computers execute instructions to: align the primary map data points and the gold source map data points with one another, where the primary map data points and the gold source map data points are located at cross-sectional ends of the each of the plurality of road segments, and determine the absolute offset between the primary map data points and the gold source map data points for all of the cross-sectional ends of the road segments located within the predefined geofenced area.

In another aspect, a distance is measured between the cross-sectional ends of the plurality of road segments, and the distance between the cross-sectional ends of each road segment is dimensioned based on a target accuracy of the primary map data.

In yet another aspect, the one or more central computers execute instructions to: determine a temporal offset between a first set of lane lines and a second set of lane lines, where the temporal offset represents the error associated with the primary map data and is a perpendicular distance measured at the same primary map data point between a first timestep and a second timestep.

In an aspect, the first set of lane lines are determined at the first timestep and are drawn based on the primary map data, and the second set of lane lines are determined at the second timestep, where the second timestep occurs after the first timestep.

In another aspect, the one or more central computers execute instructions to: determine a spatial offset between a first set of lane lines and a second set of lane lines, where the spatial offset is measured between an end portion of the first set of lane lines and a beginning position of the second set of lane lines, and the spatial offset represents the error associated with the primary map data.

In yet another aspect, the first set of lane lines are determined at a first location and the second set of lane lines are determined at a second location positioned directly adjacent to the first location.

In an aspect, the one or more central computers execute instructions to: determine a likelihood of user intervention that represents a number of times user intervention is required during autonomous driving when compared to a total number of passes by autonomous vehicles for a specific road segment located within the predefined geofenced area, where the likelihood of user intervention is representative of the error associated with the primary map data.

In another aspect, the likelihood of user intervention is expressed as:

$$P_i = \frac{U_i}{N_i}$$

where $P_i$ represents the likelihood of user intervention, $U_i$ represents the number of times user intervention is required, and $N_i$ represents the total number of passes by autonomous vehicles for the specific road segment.

In yet another aspect, a method for evaluating error associated with primary map data. The method includes determining, by one or more central computers, the error associated with the primary map data, where the primary map data represents a predefined geofenced area and the one or more central computers are in wireless communication one or more communication networks for receiving the primary map data. The method includes comparing, by the one or more central computers, the error associated with the primary map data with a range of values defined by one or more quality metric values. In response to determining the error associated with the primary map data falls within the range of values defined by the one or more quality metric values, the method includes retaining, by the one or more central computers, a template for selecting the primary map data representing the predefined geofenced area. In response to determining the error associated with the primary map data falls outside the range defined by the one or more quality metric values, the method includes evaluating, by the one or more central computers, the primary map data for real-life anomalies within one or more roadways represented by the primary map data. In response to determining no real-life anomalies exist within the one or more roadways represented by the primary map data, the method includes implementing an updated template for selecting primary map data points representing the predefined geofenced area based on the one or more quality metric values.

In an aspect, the method further comprises implementing the updated template implemented by: updating weights assigned to the primary map data points of the primary map data based on a corresponding level of accuracy.

In another aspect, method further includes determining the error associated with the primary map data based on an absolute offset between primary map data points corresponding to the primary map data and gold source map data points corresponding to gold source map data.

In yet another aspect, the method further includes receiving road network data representing a road network for the predefined geofenced area, wherein the road network is a network graph that models roadways based on a plurality of road segments.

In an aspect, the method further includes determining the absolute offset between the primary map data points and the gold source map data points based on a bounding box approach that creates a plurality of bounding boxes that each enclose one of the plurality of road segments that are part of the road network.

In another aspect, the method further includes aligning the primary map data points and the gold source map data points with one another, where the primary map data points and the gold source map data points are located at cross-sectional ends of the each of the plurality of road segments, and determining the absolute offset between the primary map data points and the gold source map data points for all of the cross-sectional ends of the road segments located within the predefined geofenced area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
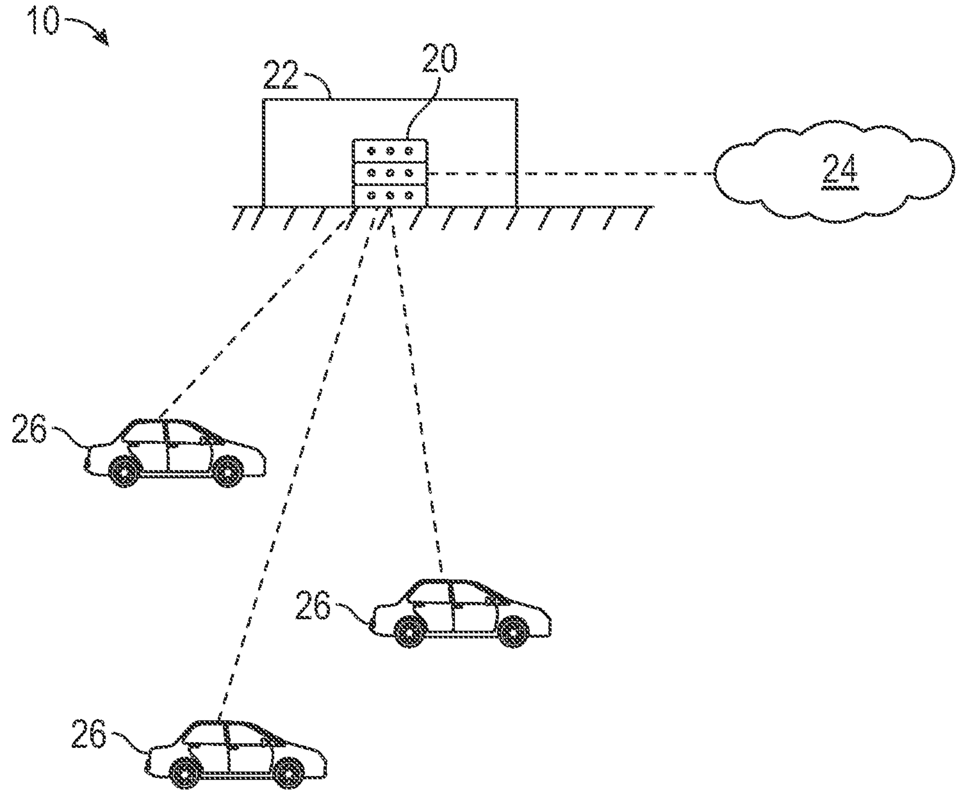
FIG. 1 is a schematic diagram of the disclosed map quality assessment system that includes one or more central computers that receive map data over one or more communication networks, according to an exemplary embodiment.

Referring to FIG. 1, an exemplary map quality assessment system 10 for evaluating error associated with map data is illustrated. The map quality assessment system 10 includes one or more central computers 20 located at a back-end office 22, where the one or more central computers 20 are in wireless communication with one or more communication networks 24. The one or more central computers 20 obtain primary map data via the one or more communication networks 24. In one embodiment, the one or more central computers 20 may also obtain gold source map data as well via the one or more communication networks 24. However, it is to be appreciated that in some embodiments the gold source map data may be unavailable.

The primary map data and the gold source map data both represent the same predefined geofenced area. The predefined geofenced area represents a real-world geographical area that is defined by a virtual perimeter. It is to be appreciated that the primary map data is based on one or more unique sources of data such as, for example, global positioning system (GPS) data, image data collected by an on-board camera of a vehicle, a vehicle telemetry source, aerial or satellite image data, or data collected from survey vehicles. Some examples of versions of primary map data include, but are not limited to, crowdsourced map data, telemetry-based map data, and aerial map data. The gold source map data represents ground truth data or, alternatively, the most accurate and up-to-date version of map data representing the predefined geofenced area currently available. In one non-limiting embodiment, the gold source map data is high-definition map data.

In the non-limiting embodiment as shown in FIG. 1, the one or more central computers 20 are in wireless communication with one or more autonomous vehicles 26. Although autonomous vehicles are described, it is to be appreciated that semi-autonomous vehicles that are equipped with an advanced driver assistance system (ADAS) may be included as well. After evaluating the primary map data, the one or more central computers 20 may share a vehicle map that is generated based on the primary map data with the one or more autonomous vehicles 26. As explained below, the one or more central computers 20 evaluate the error associated with the primary map data based on an absolute offset between primary map data points and gold source map data points. Alternatively, in another embodiment the one or more central computers 20 determine the error associated with the primary map data based on self-evaluation without the gold source map data. In yet another embodiment, the error associated with the primary map data is based on a likelihood of user intervention during autonomous driving. It is to be appreciated that the error associated with the primary map data may represent any type of error that is associated with map data such as, but not limited to, lateral bias error or perception error. In one embodiment, the primary map data is created specifically for an autonomous driving system such as, for example, an automated driving system (ADS) or ADAS.

Figure 2:
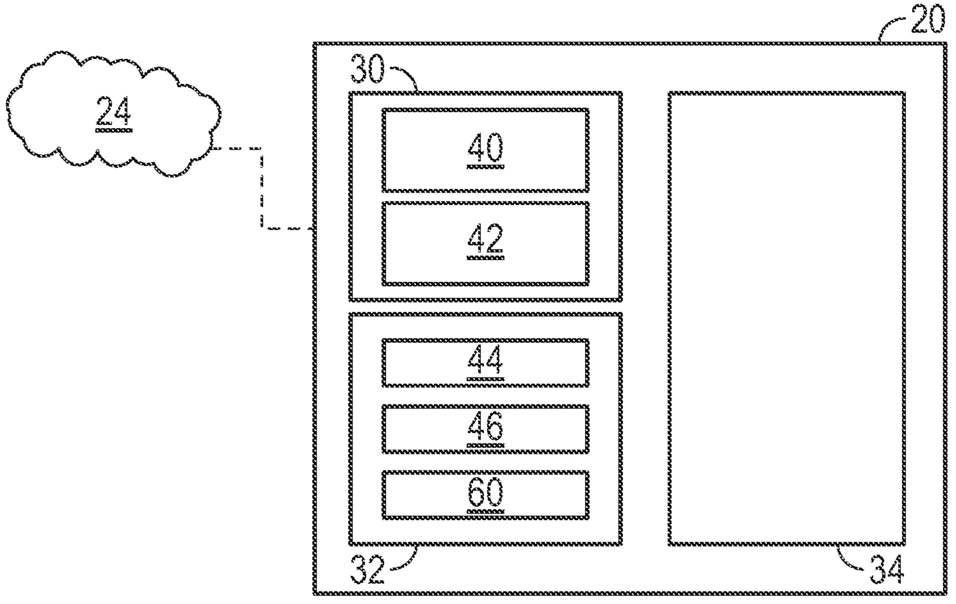
FIG. 2 is a block diagram illustrating the software architecture for the one or more central computers shown in FIG. 1, according to an exemplary embodiment.

FIG. 2 is a block diagram illustrating the software architecture of the one or more central computers 20 shown in FIG. 1. In the example as shown in FIG. 2, the one or more central computers 20 includes a gold source evaluation module 30, a self-evaluation module 32, and a selection module 34. As explained below, the gold source evaluation module 30 compares the primary map data with the gold source map data to determine the error associated with the primary map data, while the self-evaluation module 32 determines the error when the gold source map data is unavailable. Referring to both FIGS. 1 and 2, the gold source evaluation module 30 of the one or more central computers 20 includes a bounding box evaluation submodule 40 that compares the primary map data with the gold source map data based on a bounding box approach and a cross-sectional evaluation submodule 42 that compares the primary map data with the gold source map data based on a cross-sectioned approach, which are both described below.

The one or more central computers 20 receives road network data representing a road network of the predefined geofenced area as input from the one or more communication networks 24, where the road network is a network graph that models roadways based on a plurality of road segments. The one or more central computers 20 also receives the primary map data and the gold source map data that both represent the predefined geofenced area from the one or more communication networks 24 as well. One example of road network data is the open street map (OSM), however, it is to be appreciated that other types of road network data may be used as well.

Figure 3:
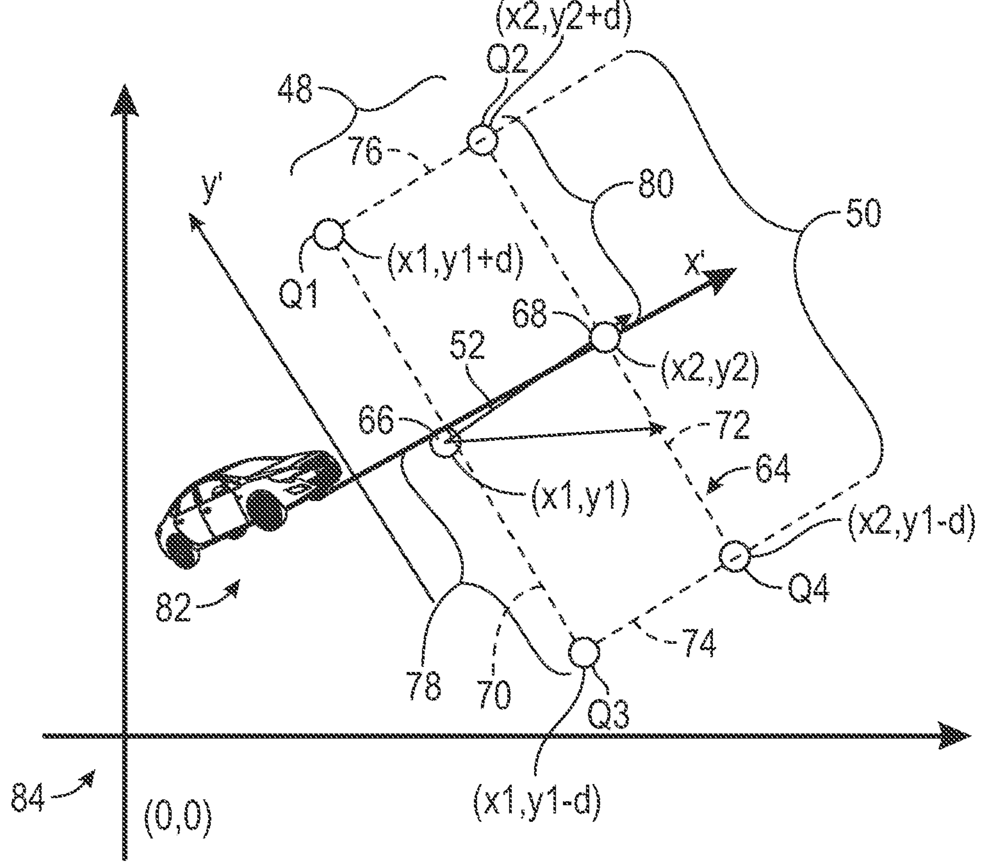
FIG. 3 is schematic diagram of a bounding box determined by the one or more central computers, according to an exemplary embodiment.

Evaluating the primary map data for the absolute offset between the primary map data with the gold source map data based on a bounding box approach shall now be described. The bounding box evaluation submodule 40 of the one or more central computers 20 divides the road network data into a plurality of road segments 52, which is illustrated in FIG. 3. Referring to both FIGS. 2 and 3, each of the plurality of road segments 52 include the same length, where the length of each road segment 52 may be equal to an average accurate perception range of a vehicle 26. In one non-limiting embodiment, the length is about fifty meters. The bounding box evaluation submodule 40 of the one or more central computers 20 creates bounding boxes 64 corresponding to the primary map data and the gold source map data. Each bounding box 64 has a width 48 and a height 50 (i.e., a maximum height). Each bounding box 64 encompasses one road segment 52, and the width 48 of each bounding box 64 is equal to the length of the road segment 52. The height 50 of the bounding box 64 may be greater than the width 48 of the bounding box 64.

With reference to FIG. 3, the bounding boxes 64 encompass the road segment 52. Each road segment 52 includes at least two road-segment points (i.e., the first road-segment point 66 and the second road-segment point 68) that define the boundaries of the road segment 52. In FIG. 3, the bounding box 64 includes a first linear boundary 70, a second linear boundary 72, a third linear boundary 74, and a fourth linear boundary 76. The first linear boundary 70 intersects the first road-segment point 66. The second linear boundary 72 intersects the second road-segment point 68. The first linear boundary 70 is parallel to the second linear boundary 72. The third linear boundary 74 is parallel to the fourth linear boundary 76. The distance 78 from the third linear boundary to the first road-segment point 66 along the first direction y' is equal to the distance 80 from the second road-segment point 68 to the fourth linear boundary 76 along the first direction y'. The height 50 (i.e., maximum height) of the bounding box extends from the third linear boundary 74 to the fourth linear boundary 76. The distance 80 from the second road-segment point 68 to the fourth linear boundary 76 along the first direction y' is half of the maximum height of the first bounding box. The road segment 52 is parallel to a second direction x'. The second direction x' is orthogonal to the first direction y' the first direction y' and the second direction x' may be defined as axes that form a vehicle coordinate system 82 for the bounding box 64.

As discussed above, the first road-segment point 66 and the second road-segment point 68 define the extreme ends (i.e., termini) of the road segment 52. The bounding box evaluation submodule 40 of the one or more central computers 20 uses the first road-segment point 66 and the second road-segment point 68 to create the bounding box 64. In the vehicle coordinate system 82, the x'-axis (which is defined by the x' direction) is parallel to the road segment 52, and the y'-axis (which is defined by the y' direction is perpendicular to the road segment 52. The angle θ is the heading of a vehicle 26. In vehicle coordinate system 82, the first road-segment point 66 is at coordinate (x1, y1) of the vehicle coordinate system 82, and the second road-segment point 68 is at coordinate (x2, y2). The distance 80 from the second road-segment point 68 to the fourth linear boundary 76 along the first direction y' is half of the height 50 of the bounding box 64. Distance 80 from the second road-segment point 68 to the fourth linear boundary 76 is constant for all the bounding boxes 64. Further, the distance 80 from the second road-segment point 68 to the fourth linear boundary 76 along the first direction y' may be represented by the letter "d". The bounding box defines four corner points (i.e., first corner point Q1 at coordinate $(x1, y1+d)$, second corner point Q2 at coordinate $(x2, y2+d)$, third corner point Q3 $(x1, y1-d)$, and fourth corner point Q4 $(x2, y1-d)$.

With continued reference to FIG. 3, the coordinate of the origin of the vehicle coordinate system 82 is $(m, n)$. The origin of the vehicle coordinate system 82 is translated to the origin of a global coordinate system 84. At this juncture, the coordinates of the bounding boxes will be the following: first corner point Q1 $(x1+m, y1+d+n)$, second corner point Q2 $(x2+m, y2+d+n)$, third corner point Q3 $(x1+m, y1-d+n)$, and fourth corner point Q4 $(x2+m, y2-d+n)$. Then, the vehicle coordinate system 82 is rotated such that the x'-axis of the vehicle coordinate system 82 aligns with the x-axis of the global coordinate system 84 and the y'-axis of the vehicle coordinate system 82 aligns of the y-axis of the global coordinate system 84. In this rotation, the rotation angle in clockwise is e (which is the heading of the vehicle 26). After the rotation, in the global coordinate system xy, the coordinates of the bounding box 64 are: the first corner point Q1 $((x1+m)*\cos\theta+(y1+d+n)*\sin\theta, (y1+d+n)*\cos\theta-(x1+m)*\sin\theta)$, the second corner point Q2 $((x2+m)*\cos\theta+(y2+d+n)*\sin\theta, (y2+d+n)*\cos\theta-(x2+m)*\sin\theta)$, the third corner point Q3 $((x1+m)*\cos\theta+(y1-d+n)*\sin\theta, (y1-d+n)*\cos\theta-(x1+m)*\sin\theta)$, and the fourth corner point Q4 $((x2+m)*\cos\theta+(y2-d+n)*\sin\theta, (y2-d+n)*\cos\theta-(x2+m)*\sin\theta)$.

The bounding box evaluation submodule 40 of the one or more central computers 20 creates a primary map tile and a gold source map tile based on the primary map data and the gold source map data, respectively, by filtering out the map data inside the bounding box 64. The primary map tile is obtained by filtering the primary map data, and the gold source map tile is obtained by filtering the gold source map data. For all the bounding boxes 64, the bounding box evaluation submodule 40 of the one or more central computers 20 creates the primary map tile and the gold source map tile from the primary map data and the gold source map data, respectively. The filtered data to create the map tiles (i.e., the primary map tile and the gold source map tile) may be part of the map data inside of the bounding box 64 but outside the lane lines.

The bounding box evaluation submodule 40 of the one or more central computers 20 executes a point cloud registration to align the plurality of primary map data points in the primary map tile with the plurality of gold source map data points in the gold source map tile using rotation and translation transformations to determine the absolute offsets between the primary map data points of the primary map data and the gold source map data points of the gold source map data. Specifically, an iterative closest point (ICP) process or algorithm may align the plurality of primary map data points in the primary map tile with the plurality of gold source map data points in the gold source map tile using rotation and translation transformations. Furthermore, a random initialization process may be used to align the primary map data points with the gold source map data points based on the point cloud registration.

The bounding box evaluation submodule 40 of the one or more central computers 20 builds a KD tree with the primary map data points using a KD algorithm, where the primary map points data are created first as the line segments. Then, the center points of the line segments are obtained and designated as the KD tree nodes. For each point for the gold source map data, the nearest point by KD tree query and the corresponding line segments from the primary map data is determined. Then, the offset from this point on the gold source map data to the line segments from the first map is calculated. The bounding box evaluation submodule 40 of the one or more central computers 20 determines, based on the KD tree, the absolute offsets from each of the plurality of primary map data points to each corresponding gold source map data points. To do so, the bounding box evaluation submodule 40 of the one or more central computers 20 calculates the distance from one of the primary map data points of the primary map data to the corresponding gold source map data point of the gold source map data. This is repeated from all to determine all absolute offsets between the primary map data points and the gold source map data points. The bounding box evaluation submodule 40 of the one or more central computers 20 then determines the relative map error based on a histogram of all of the absolute offsets.

Figure 4:
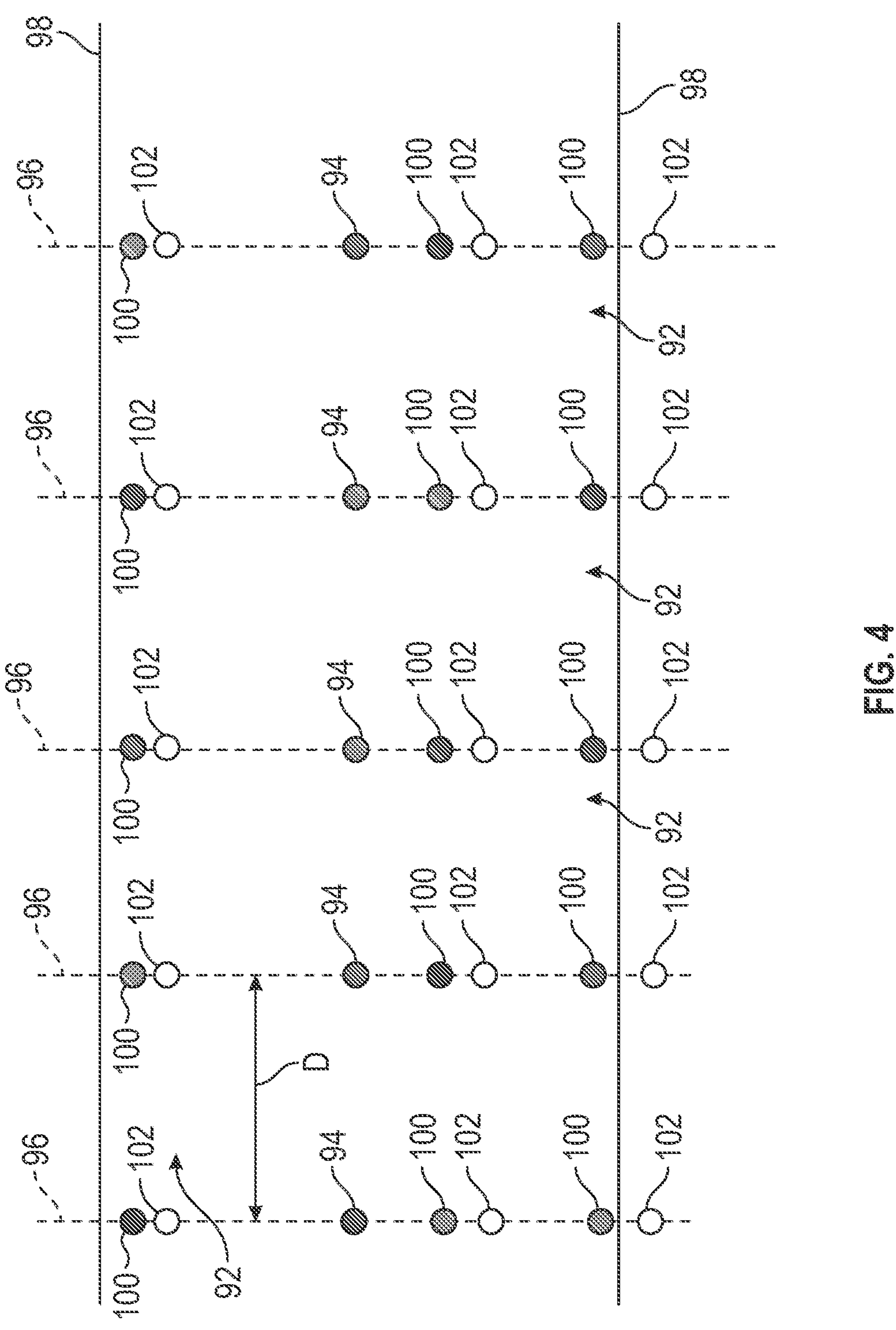
FIG. 4 is a schematic diagram of a road network data including a plurality of cross-sectioned road segments, according to an exemplary embodiment.

An approach to determine the absolute offset between the primary map data points and the gold source map data points based on a cross-sectioned approach shall now be described. FIG. 4 is an illustration of the road network data of the predefined geofenced area, where the roadways located within the predefined geofenced area are represented by a plurality of road segments 92, a plurality of nodes 94, and opposing road edges 98. The plurality of nodes 94 each represent a cross-sectional end 96 of one of the road segments 92. The opposing road edges 98 represent theoretical road edges, and not the opposing topological graph edges. It is to be appreciated that the opposing road edges 98 include a unique edge identifier (ID), where each edge ID identifies a pair of opposing road edges 98 corresponding to a particular road segment 92. A distance D is measured between the cross-sectional ends 96 of the road segments 92, where the distance D between the cross-sectional ends 96 of each road segment 92 is dimensioned based on a target accuracy of the primary map data. Merely by way of example, if the primary map data is created for an autonomous driving system such as ADS or ADAS, then the distance D between the cross-sectional ends 96 of the road segments 92 is about one meter.

The cross-sectional evaluation submodule 42 of the one or more central computers 20 determines the absolute offset between primary map data points 100 that correspond to the primary map data and gold source map data points 102 that correspond to the gold source map data by first aligning the primary map data points 100 and the gold source map data points 102 with one another. As seen in FIG. 4, the primary map data points 100 and the gold source map data points 102 are located at the cross-sectional ends 96 of the road segments 92. The cross-sectional evaluation submodule of the one or more central computers 20 aligns the primary map data points 100 and the gold source map data points 102 with one another by executing one or more map matching algorithms to perform topology. As seen in FIG. 4, the cross-sectional ends 96 of each road segment 92 intersect one or more primary map data points 100 and one or more corresponding gold source map data points 102. The cross-sectional evaluation submodule 42 of the one or more central computers 20 then determines an absolute offset between the one or more primary map data points 100 and the one or more corresponding gold source map data points 102 for all of the cross-sectional ends 96 of the road segments 92 located within the predefined geofenced area. The cross-sectional evaluation submodule 42 of the one or more central computers 20 then determines a sum of all the absolute offsets for each road segment 92 within the predefined geofenced area and divides the sum of all the absolute offsets with a total number of road segment 92 within the predefined geofenced area to determine the relative error.

As mentioned above, the self-evaluation module 32 determines map error when the gold source map data is unavailable. Referring to both FIGS. 1 and 2, the self-evaluation module 32 of the one or more central computers 20 includes a temporal evaluation submodule 44 that determines the error of the primary map data based on temporal inconsistencies, a spatial evaluation submodule 46 that determines the error of the primary map data based on spatial inconsistencies, and a user intervention submodule 60 that determines the error of the primary map data based user intervention during autonomous or semi-autonomous driving. It is to be appreciated that while FIG. 2 illustrates the one or more central computers 20 determining the error based on temporal inconsistencies or spatial inconsistencies, the error may be determined locally by one or more controllers that are part of one of the autonomous vehicles 26 (FIG. 1) instead.

Figure 5A:
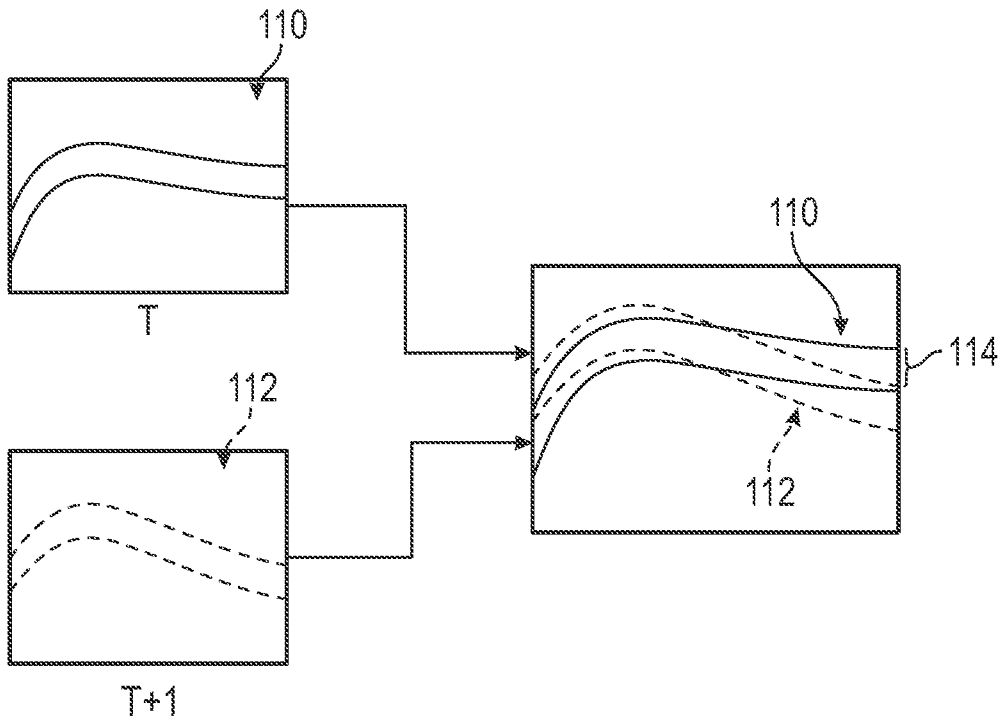
FIG. 5A is a schematic diagram illustrating an approach to determine error associated with primary map data based on temporal inconsistencies, according to an exemplary embodiment.

Determining the error based on temporal inconsistencies shall now be described. FIG. 5A is a schematic diagram of a first set of lane lines 110 determined at a first timestep T that are drawn based on the primary map data. FIG. 5A also includes a second set of lane lines 112 determined at a second timestep T+1, where the second timestep T+1 occurs after the first timestep T. Both the first set of lane lines 110 and the second set of lane lines 112 represent the same roadway.

Referring to both FIGS. 2 and 5A, the temporal evaluation submodule 44 of the one or more central computers 20 determines a temporal offset 114 between the first set of lane lines 110 and the second set of lane lines 112, where the temporal offset 114 represents the error of the primary map data. The temporal offset 114 represents a perpendicular distance that is measured at the same primary map data point between the first timestep T and the second timestep T+1. The temporal evaluation submodule 44 of the one or more central computers 20 then compares the temporal offset 114 with a temporal threshold value, where the temporal threshold value is selected based on a target level of accuracy. It is to be appreciated that the target level of accuracy is determined based on the specific application of the primary map data. In one embodiment, if the temporal error associated with any of the primary map data points exceeds the temporal threshold value, then a notification is generated.

In one embodiment, the temporal evaluation submodule 44 of the one or more central computers 20 selects the maximum temporal offset value from the primary map data points as the overall temporal offset of the primary map data. Specifically, Equation 1 determines the overall temporal offset of the primary map data, which is as follows:

$$II_T = \max_i \left| \vec{A}i - \frac{\vec{B}i \cdot \vec{A}i}{|\vec{A}i|} \right| \quad \text{Equation 1}$$

where $II_T$ represents the overall temporal offset of the primary map data, i represents the total number of primary map data points that define the lane lines 110, 112, $\vec{A}i$ represents a point along the the first set of lane lines 110 at the first timestep T, and $\vec{B}i$ represents a point along the second set of lane lines 112 at the second timestep T2.

Figure 5B:
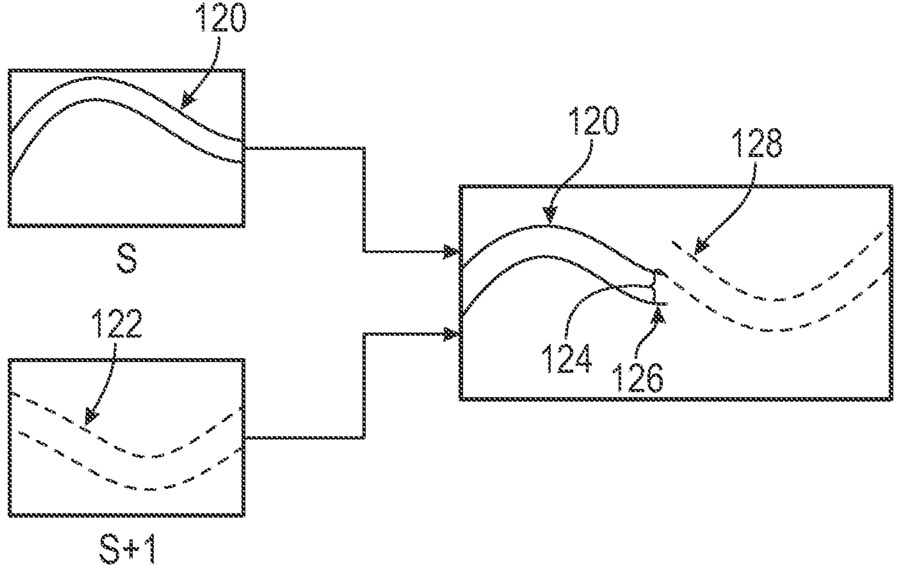
FIG. 5B is a schematic diagram illustrating an approach to determine the error associated with the primary map data based on spatial inconsistencies, according to an exemplary embodiment.

Determining the error based on spatial inconsistencies shall now be described. FIG. 5B is a schematic diagram of a first set of lane lines 120 determined at a first location S that are drawn based on the primary map data. FIG. 5B also includes a second set of lane lines 122 based on the primary map data that are determined at a second location S+1, where the second location S+1 is positioned directly adjacent to the first location S. It is to be appreciated that the second location S+1 is positioned directly adjacent to the first location S in either the lateral or the longitudinal direction.

Referring to FIGS. 2 and 5B, the spatial evaluation submodule 46 of the one or more central computers 20 determines a spatial offset 124 between the first set of lane lines 120 and the second set of lane lines 122, where the spatial offset 124 is measured between an end portion 126 of the first set of lane lines 120 and a beginning position 128 of the second set of lane lines 122 where the first set and the second set of lane lines 120, 122 overlap. The spatial offset 124 represents the error associated with the primary map data. The spatial evaluation submodule 46 of the one or more central computers 20 then compares the spatial offset 124 with a spatial threshold value, where the spatial threshold value is selected based on the target level of accuracy described above. In one embodiment, if the spatial error associated with any of the primary map data points exceeds the spatial threshold value, then a notification is generated.

In one embodiment, the spatial evaluation submodule 46 of the one or more central computers 20 determines the spatial offset 124 based on Equation 2, which is as follows:

$$II_s = \left| \overrightarrow{A_{End}} - \frac{\overrightarrow{B_{Beginning}} \cdot \overrightarrow{A_{End}}}{|\overrightarrow{A_{End}}|} \right| \quad \text{Equation 2}$$

where $II_s$ represents the overall spatial offset of the primary data points, $\overrightarrow{A_{End}}$ represents a point at the end portion 126 of the first set of lane lines 120, and $\overrightarrow{B_{Beginning}}$ represents a point at the beginning position 128 of the second set of lane lines 122.

Referring to FIG. 2, the user intervention submodule 60 of the one or more central computers 20 determines a likelihood of user intervention during autonomous driving, where the likelihood of user intervention is representative of the error associated with the primary map data. This is because when the error associated with the primary map data is relatively low, the autonomous vehicle 26 (FIG. 1) may be navigated with minimal or no user intervention. However, as the error increases, the instances when a user intervenes by performing one or more manual driving maneuvers to navigate the vehicle during autonomous driving increases. The user intervention represents one or more manual driving maneuvers that are executed by a user to accommodate the error associated with the primary map data. Some examples of map error that may cause the user to execute one or more manual driving maneuvers include, but are not limited to, map curvature error, lane line inaccuracies, perception issues, missing signage, and the wrong location of signage.

In one embodiment, the likelihood of user intervention represents a number of times user intervention is required during autonomous driving when compared to a total number of passes by autonomous vehicles for a specific road segment located within the predefined geofenced area. Specifically, in one embodiment, the likelihood of user intervention is expressed in Equation 3, and is as follows:

$$P_i = \frac{U_i}{N_i} \quad \text{Equation 3}$$

where $P_i$ represents the likelihood of user intervention, $U_i$ represents the number of times user intervention is required, and $N_i$ represents the total number of passes by autonomous vehicles for the specific road segment.

Referring to FIG. 2, the selection module 34 of the one or more central computers 20 receives the error associated with the primary map data from either the gold source evaluation module 30 or the self-evaluation module 32 and compares the error associated with the primary map data with one or more quality metric values. The quality metric values are each based on a specific quality metric that is indicative of the quality of the primary map data and are based on the target level of accuracy of the primary map data. As mentioned above, the target level of accuracy is determined based on the specific application of the primary map data. Merely by way of example, in one embodiment the quality metric values indicate an estimated horizontal position error (EHPE) of the primary map data, however, it is to be appreciated that other measures of quality may be used as well such as, for example, confidence values. In one non-limiting embodiment, the quality metric values may be defined by a range of values. For example, the range of quality metric values may be expressed as a number ranging from 0 to 9, where 0 represents the greatest level of accuracy and 9 represents the lowest level of accuracy. In one embodiment, the one or more quality metric values may be weighted based on importance, where primary map data points including a higher level of accuracy are assigned a higher importance when compared to primary map data points including a lower level of accuracy.

The selection module 34 of the one or more central computers 20 compares the error associated with the primary map data with the one or more quality metric values. In response to determining the error associated with the primary map data falls within the range of values defined by the one or more quality metric values, the selection module 34 retains a template for selecting the primary map data representing the predefined geofenced area based on the one or more quality metric values. The template for selecting the primary map data points assigns weights to the primary map data points, where greater weight is assigned to the primary map data points including a higher level of accuracy and less weight is assigned to the primary map data points that include a lower level of accuracy. The selection module 34 of the one or more central computers 20 may then generate a vehicle map based on the primary map data. In embodiments, the vehicle map may be shared with the one or more autonomous vehicles 26 (FIG. 1).

In response to determining the error associated with the primary map data that falls outside the range defined by the one or more quality metric values, the selection module 34 of the one or more central computers 20 then evaluates the primary map data for real-life anomalies within one or more roadways represented by the primary map data. The real-life anomalies within the one or more roadways may adversely affect the accuracy of the primary map data. Some examples of the real-life anomalies within the one or more roadways include, but are not limited to, faded lane lanes, repainted lane lines, construction activity, road closures, and traffic incidents. In response to detecting one or more real-life anomalies within the one or more roadways represented by the primary map data, the selection module 34 of the one or more central computers 20 continues to monitor the primary map data until the real-life anomalies no longer exist, and then collects a new set of primary map data for evaluation.

In response to determining no real-life anomalies exist within the one or more roadways represented by the primary map data, the selection module 34 of the one or more central computers 20 implements an updated template for selecting the primary map data points representing the predefined geofenced area based on the one or more quality metric values. The updated template is implemented by updating the weights assigned to the primary map data points of the primary map data based on a corresponding level of accuracy. Specifically, the weights corresponding to the primary map data points including a higher level of accuracy based on the one or more quality metric values are assigned a higher weighted value, while the weights corresponding to the primary map data points including a lower level of accuracy based on the one or more quality metric values are assigned a lower weighted value.

In one embodiment, the weights are assigned to the primary map data points based on a probability distribution to ensure that the primary map data points include a mix of different levels of error. In an embodiment, the updated template is determined based on an iterative process, where a selection criteria to determine the new weighted values is refined during each iteration until the error associated with the primary map data falls within the range defined by the one or more quality metric values.

Figure 6:
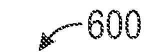
FIG. 6 is a process flow diagram illustrating a method for evaluating the error associated with the primary map data, according to an exemplary embodiment.
Figure 6:
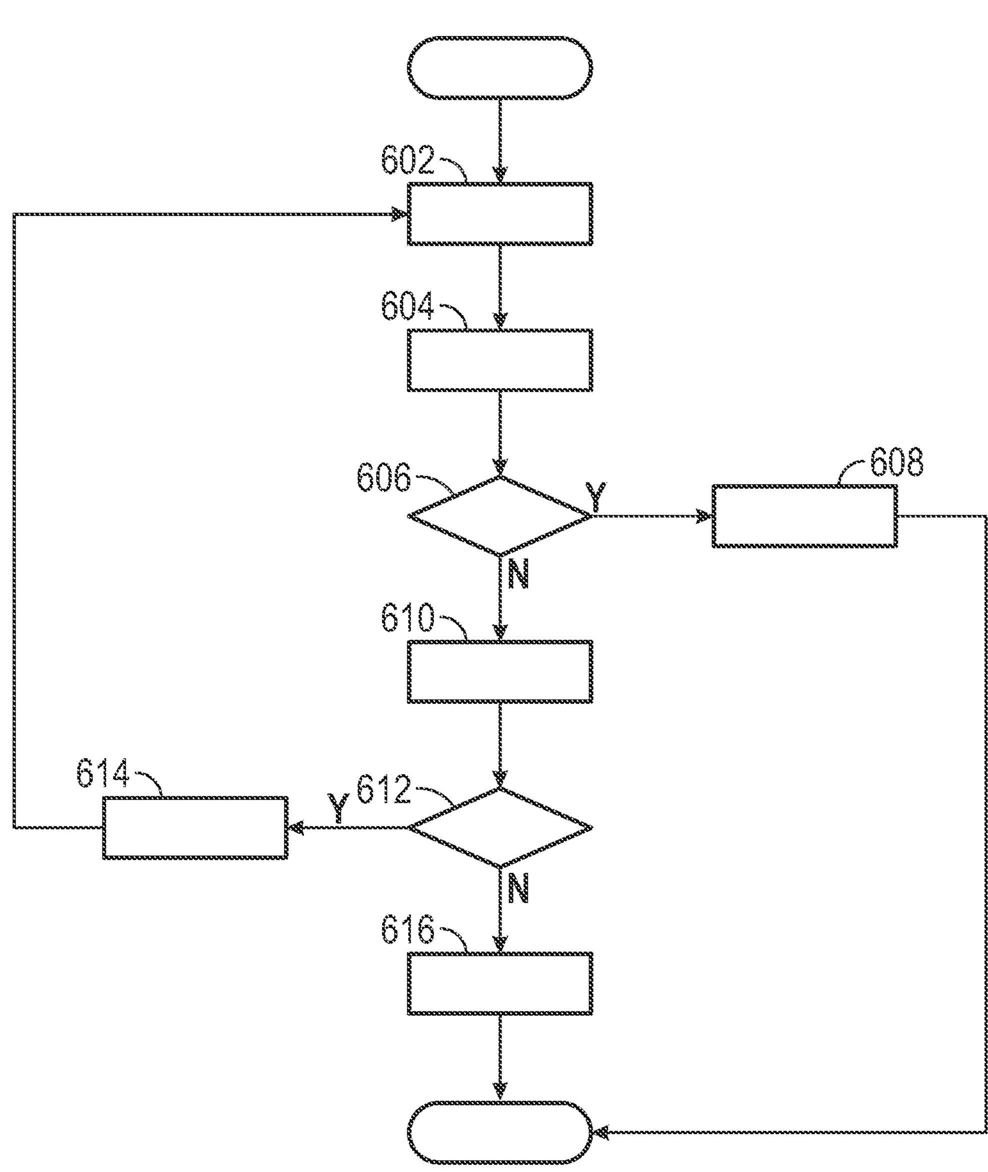

FIG. 6 is a process flow diagram illustrating a method 600 for evaluating the error associated with the primary map data by the map quality assessment system 10 shown in FIG. 1. Referring generally to FIGS. 1-6, the method 600 may begin at block 602. In block 602, the one or more central computers 20 determine the error associated with the primary map data, where the primary map data represents the predefined geofenced area. As mentioned above, the one or more central computers 20 may determine the error associated with the primary map data based on a variety of different approaches. Specifically, in one embodiment, the error is an absolute offset between the primary map data points and the gold source map data points. In another embodiment, the one or more central computers 20 determine the error associated with the primary map data based on self-evaluation without the gold source map data. In yet another embodiment, the error associated with the primary map data is based on a likelihood of user intervention during autonomous driving. The method 600 may then proceed to block 604.

In block 604, the the selection module 34 of the one or more central computers 20 compares the error associated with the primary map data with the range of values defined by the one or more quality metric values. The method 600 may then proceed to decision block 606.

In decision block 606, in response to determining the error associated with the primary map data falls within the range of values defined by the one or more quality metric values, the method 600 proceeds to block 608. In block 608, the selection module 34 of the one or more central computers 20 retains the template for selecting the primary map data representing the predefined geofenced area. In an embodiment, the one or more central computers 20 may generate a vehicle map based on the primary map data that is transmitted to the autonomous vehicle 26 located within the predefined geofenced area. The method 600 may then terminate.

Returning back to decision block 606, in response to determining the error associated with the primary map data falls outside the range defined by the one or more quality metric values, the method 600 proceeds to block 610. The block 610, the selection module 34 of the one or more central computers 20 evaluates the primary map data for real-life anomalies within one or more roadways represented by the primary map data. The method 600 may then proceed to decision block 612.

In decision block 612, in response to detecting one or more real-life anomalies within the one or more roadways represented by the primary map data, the method 600 proceeds to block 614. In block 614, the selection module 34 of the one or more central computers 20 continues to monitor the primary map data until the real-life anomalies no longer exist, and then collects a new set of primary map data for evaluation. The method 600 may then return to block 602.

Referring back to decision block 612, in response to determining no real-life anomalies exist within the one or more roadways represented by the primary map data, the method 600 proceeds to block 616. In block 616, the selection module 34 of the one or more central computers 20 implements the updated template for selecting the primary map data points representing the predefined geofenced area based on the one or more quality metric values. As mentioned above, the updated template is implemented by updating the weights assigned to the primary map data points of the primary map data based on a corresponding level of accuracy. The method 600 may then terminate.

Referring generally to the figures, the disclosed map quality assessment system provides various technical effects and benefits. Specifically, the map quality assessment system provides an approach to evaluate the error associated with map data. It is to be appreciated that the map quality assessment system provides a variety of approaches to determine the error associated with the map data. In particular, the error may be determined based on gold source map data or, in the alternative, based on a self-evaluation when the gold source map data is unavailable.

The central computers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A map quality assessment system that evaluates error associated with primary map data, the map quality assessment system comprising:

one or more central computers in wireless communication one or more communication networks for receiving the primary map data, the one or more central computers executing instructions to:

determine the error associated with the primary map data, wherein the primary map data represents a predefined geofenced area;

compare the error associated with the primary map data with a range of values defined by one or more quality metric values;

in response to determining the error associated with the primary map data falls within the range of values defined by the one or more quality metric values, retain a template for selecting the primary map data representing the predefined geofenced area;

in response to determining the error associated with the primary map data falls outside the range defined by the one or more quality metric values, evaluate the primary map data for real-life anomalies within one or more roadways represented by the primary map data;

determine the error associated with the primary map data based on an absolute offset between primary map data points corresponding to the primary map data and gold source map data points corresponding to gold source map data;

receive road network data representing a road network for the predefined geofenced area, wherein the road network is a network graph that models roadways based on a plurality of road segments, wherein the one or more central computers determine the absolute offset between the primary map data points and the gold source map data points based on a bounding box approach that creates a plurality of bounding boxes that each enclose one of the plurality of road segments that are part of the road network, and wherein the road network data is divided into a plurality of road segments including the same length, and the length of each road segment is equal to an average perception range of a vehicle; and in response to determining no real-life anomalies exist within the one or more roadways represented by the primary map data, implement an updated template for selecting primary map data points representing the predefined geofenced area based on the one or more quality metric values.

2. The map quality assessment system of claim 1, wherein the one or more central computers execute instructions to implement the updated template implemented by:

updating weights assigned to the primary map data points of the primary map data based on a corresponding level of accuracy.

3. The map quality assessment system of claim 2, wherein the weights corresponding to the primary map data points including a higher level of accuracy based on the one or more quality metric values are assigned a higher weighted value and the weights corresponding to the primary map data points including a lower level of accuracy based on the one or more quality metric values are assigned a lower weighted value.

4. The map quality assessment system of claim 1, wherein the one or more central computers execute instructions to:

align the primary map data points and the gold source map data points with one another, wherein the primary map data points and the gold source map data points are located at cross-sectional ends of the each of the plurality of road segments; and determine the absolute offset between the primary map data points and the gold source map data points for all of the cross-sectional ends of the road segments located within the predefined geofenced area.

5. The map quality assessment system of claim 4, wherein a distance is measured between the cross-sectional ends of the plurality of road segments, and wherein the distance between the cross-sectional ends of each road segment is dimensioned based on a target accuracy of the primary map data.

6. The map quality assessment system of claim 1, wherein the one or more central computers execute instructions to:

determine a temporal offset between a first set of lane lines and a second set of lane lines, wherein the temporal offset represents the error associated with the primary map data and is a perpendicular distance measured at the same primary map data point between a first timestep and a second timestep.

7. The map quality assessment system of claim 6, wherein the first set of lane lines are determined at the first timestep and are drawn based on the primary map data, and the second set of lane lines are determined at the second timestep, wherein the second timestep occurs after the first timestep.

8. The map quality assessment system of claim 1, wherein the one or more central computers execute instructions to:

determine a spatial offset between a first set of lane lines and a second set of lane lines, wherein the spatial offset is measured between an end portion of the first set of lane lines and a beginning position of the second set of lane lines, and wherein the spatial offset represents the error associated with the primary map data.

9. The map quality assessment system of claim 8, wherein the first set of lane lines are determined at a first location and the second set of lane lines are determined at a second location positioned directly adjacent to the first location.

10. The map quality assessment system of claim 1, wherein the one or more central computers execute instructions to:

determine a likelihood of user intervention that represents a number of times user intervention is required during autonomous driving when compared to a total number of passes by autonomous vehicles for a specific road segment located within the predefined geofenced area, wherein the likelihood of user intervention is representative of the error associated with the primary map data.

11. The map quality assessment system of claim 10, wherein the likelihood of user intervention is expressed as:

$$P_i = \frac{U_i}{N_i}$$

wherein $P_i$ represents the likelihood of user intervention, $U_i$ represents the number of times user intervention is required, and $N_i$ represents the total number of passes by autonomous vehicles for the specific road segment.

12. A method for evaluating error associated with primary map data, the method comprising:

determining, by one or more central computers, the error associated with the primary map data, wherein the primary map data represents a predefined geofenced area and the one or more central computers are in wireless communication one or more communication networks for receiving the primary map data;

comparing, by the one or more central computers, the error associated with the primary map data with a range of values defined by one or more quality metric values;

in response to determining the error associated with the primary map data falls within the range of values defined by the one or more quality metric values, retaining, by the one or more central computers, a template for selecting the primary map data representing the predefined geofenced area;

in response to determining the error associated with the primary map data falls outside the range defined by the one or more quality metric values, evaluating, by the one or more central computers, the primary map data for real-life anomalies within one or more roadways represented by the primary map data;

determining the error associated with the primary map data based on an absolute offset between primary map data points corresponding to the primary map data and gold source map data points corresponding to gold source map data;

receiving road network data representing a road network for the predefined geofenced area, wherein the road network is a network graph that models roadways based on a plurality of road segments;

determining the absolute offset between the primary map data points and the gold source map data points based on a bounding box approach that creates a plurality of bounding boxes that each enclose one of the plurality of road segments that are part of the road network, wherein the road network data is divided into a plurality of road segments including the same length, and the length of each road segment is equal to an average perception range of a vehicle; and in response to determining no real-life anomalies exist within the one or more roadways represented by the primary map data, implementing an updated template for selecting primary map data points representing the predefined geofenced area based on the one or more quality metric values.

13. The method of claim 12, wherein the method further comprises implementing the updated template implemented by:

updating weights assigned to the primary map data points of the primary map data based on a corresponding level of accuracy.

14. The method of claim 12, wherein the method further comprises:

aligning the primary map data points and the gold source map data points with one another, wherein the primary map data points and the gold source map data points are located at cross-sectional ends of the each of the plurality of road segments; and determining the absolute offset between the primary map data points and the gold source map data points for all of the cross-sectional ends of the road segments located within the predefined geofenced area.

* * * * *